US012540082B2

(12) United States Patent
Arai et al.

(10) Patent No.: US 12,540,082 B2
(45) **Date of Patent: *Feb. 3, 2026**

(54) COBALT FERRITE PARTICLE PRODUCTION METHOD AND COBALT FERRITE PARTICLES PRODUCED THEREBY

(71) Applicant: NITTETSU MINING CO., LTD., Tokyo (JP)

(72) Inventors: Tsubasa Arai, Tokyo (JP); Naoki Muratani, Kochi (JP); Akira Kishimoto, Tokyo (JP); Hideyuki Takahashi, Miyagi (JP)

(73) Assignee: NITTETSU MINING CO., LTD., Tokyo (JP)

( * ) Notice: Subject to any disclaimer, the term of this patent is extended or adjusted under 35 U.S.C. 154(b) by 984 days.

This patent is subject to a terminal disclaimer.

(21) Appl. No.: 17/611,787

(22) PCT Filed: Apr. 8, 2020

(86) PCT No.: PCT/JP2020/015762
§ 371 (c)(1),
(2) Date: Nov. 16, 2021

(87) PCT Pub. No.: WO2020/241065
PCT Pub. Date: Dec. 3, 2020

(65) Prior Publication Data

US 2022/0234910 A1 Jul. 28, 2022

(30) Foreign Application Priority Data

May 24, 2019 (JP) ................................ 2019-097557

(51) Int. Cl.
*C01G 49/08* (2006.01)
*G03G 9/083* (2006.01)

(52) U.S. Cl.
CPC .......... *C01G 49/08* (2013.01); *G03G 9/0833* (2013.01); *G03G 9/0839* (2013.01); *C01P 2004/61* (2013.01); *C01P 2006/42* (2013.01); *C01P 2006/62* (2013.01)

(58) Field of Classification Search
CPC .............. C01P 2004/61; C01P 2006/42; C01P 2006/62; G03G 9/0833; G03G 9/0839
See application file for complete search history.

(56) References Cited

U.S. PATENT DOCUMENTS

| | | | | |
|---|---|---|---|---|
| 3,822,210 | A * | 7/1974 | Iwase | C01B 13/363 252/62.62 |
| 4,066,564 | A * | 1/1978 | Sasazawa | C01G 49/08 427/127 |
| 4,457,955 | A * | 7/1984 | Okamura | G11B 5/70673 427/127 |
| 4,473,628 | A * | 9/1984 | Kasuya | G03G 9/081 430/109.3 |
| 4,758,275 | A | 7/1988 | Yubakami et al. | |
| 4,774,012 | A * | 9/1988 | Ishikawa | G11B 5/70652 |
| 5,500,141 | A * | 3/1996 | Kormann | H01F 41/16 347/53 |
| 5,549,837 | A * | 8/1996 | Ginder | H01F 1/447 252/62.55 |
| 5,985,466 | A | 11/1999 | Atarashi et al. | |
| 2007/0184268 | A1* | 8/2007 | Kishimoto | C09C 3/063 427/212 |
| 2010/0021771 | A1* | 1/2010 | Yamazaki | B82Y 30/00 423/594.2 |
| 2016/0296906 | A1* | 10/2016 | Hirayama | B22F 1/05 |
| 2025/0197243 | A1* | 6/2025 | Arai | C01G 49/0018 |

FOREIGN PATENT DOCUMENTS

| | | |
|---|---|---|
| CN | 102730770 | 10/2012 |
| CN | 107032412 | 8/2017 |
| CN | 108906056 | 11/2018 |
| JP | 60-47722 | 1/1979 |
| JP | 03-24412 | 4/1987 |
| JP | 05-275224 | 10/1993 |
| JP | 06-33116 | 2/1994 |
| JP | 4138344 | 10/2003 |
| JP | 5504399 | 3/2014 |

OTHER PUBLICATIONS

Biswal et al. Journal of Magnetism and Magnetic Materials, 345, 2013, 1-6. published online Jun. 7, 2013 (Year: 2013).*

Ma et al., Materials Research Bulletin 48 (2013) 214-217. published online Nov. 15, 2012 (Year: 2012).*

Liu et al. Materials Letters, 65, 2011, 929-932. Published online Oct. 31, 2010 (Year: 2010).*

Xian-Ming Liu et al., "High-yield synthesis and characterization of monodisperse sub-microsized CoDe2O4 octahedra", Journal of Solid State Chemistry, 2007, vol. 180, abstract, 2. Experimental, pp. 461-466.

Nguyen Viet Long et al., "Related magnetic properties of $CoFe_2O_4$ cobalt ferrite particles synthesised by the polyol method with $NaBH_4$ and heat treatment: new micro and nanoscale structures", RSC Advances, 2015, vol. 5, 2015, pp. 56560-56569.

V.S. Kumbhar et al., "Chemical synthesis of spinel cobalt ferrite ($CoFe_2O_4$) nano-flakes for supercapacitor application", Applied Surface Science, 2012, pp. 39-43.

ISR issued in WIPO Patent Application No. PCT/JP2020/015762, Jun. 30, 2020, English translation.

(Continued)

*Primary Examiner* — Jane L Stanley

(74) *Attorney, Agent, or Firm* — GREENBLUM & BERNSTEIN, P.L.C.

(57) ABSTRACT

Provided are cobalt ferrite particles having a micrometer-order average particle diameter and similar particle diameters. When a cobalt ferrite precursor is treated at a high temperature and a high pressure, an oxidation reaction is caused in the presence of a complexing agent, thereby obtaining intended cobalt ferrite magnetic particles.

13 Claims, 3 Drawing Sheets

(56) References Cited

OTHER PUBLICATIONS

IPRP issued in WIPO Patent Application No. PCT/JP2020/015762, Feb. 2, 2021, English translation.
Office Action issued in JP Patent Application No. 2020-059761, Nov. 15, 2023, translation.
Office Action issued in EP Patent Application No. 20 811 962.8, Nov. 2, 2023.
Office Action issued in CN Patent Application No. 202080035499.3, Nov. 27, 2023, translation.
Office Action issued in CN Patent Application No. 202080035499.3, Jul. 7, 2023, translation.
Office Action issued in CN Patent Application No. 202080035499.3, May 14, 2024, translation.
Office Action issued in CN Patent Application No. 202080035499.3, Feb. 7, 2023, translation.
Yao Liu et al., "Spherical Co-Spinel Ferrites: Synthesis and Control Factors", Chinese Journal of Inorganic Chemistry, vol. 26, No. 4, pp. 596 to 602, partial translation and discussed in CN OA.
Office Action issued in KR Patent Application No. 10-2021-7042514, Feb. 1, 2025, Machine translation.

* cited by examiner

COBALT FERRITE PARTICLE PRODUCTION METHOD AND COBALT FERRITE PARTICLES PRODUCED THEREBY

TECHNICAL FIELD

The present invention relates to a method for producing cobalt ferrite particles and cobalt ferrite particles produced by the same and thus provides cobalt ferrite particles, particularly, having a relatively large average particle diameter and, furthermore, also having a narrow particle size distribution.

BACKGROUND ART

Ferrite particles are known as a highly permeable material or a permanent magnet material. Nowadays, magnetic powders have been a new material for copier toners, magnetic inks, MR fluids, and the like, and there is an expectation of improvement in quality or performance thereof.

In particular, cobalt ferrite is known as, among spinel ferrites, a magnetic material having a large crystal magnetic anisotropy and a large coercivity. In addition, cobalt is similar to iron in chemical behaviors and thus has an advantage of ease of a variety of controls in the producing process thereof.

As a method for producing ferrite particles, methods such as a co-precipitation method, a wet oxidation method and a hydrothermal method are known.

The co-precipitation method is a reaction in which two or more kinds of ions are precipitated at the same time. In the case of producing cobalt ferrite particles by the co-precipitation method, an alkali is introduced into an aqueous solution including $Fe^{3+}$ and $Co^{2+}$ ions, and then the resulting solution is heated to accelerate the reaction to thereby obtain nanosized ferrite particles. In this method, the reaction is performed at a temperature of 80° C. to 100° C., the average particle diameter of the obtained particles is approximately 20 to 50 nm, and the particle size distribution of the obtained particles is relatively wide (Patent Literature 1).

The wet oxidation method is a method in which an oxidant such as an air is reacted with a starting material aqueous solution including $Fe^{2+}$ and $Co^{2+}$ ions while being heated. In the case of using an air as the oxidant, the reaction temperature is approximately 60° C. to 100° C., and particles having a size of approximately 0.05 to 0.3 μm are obtained (Patent Literature 2 and Patent Literature 3). In a method in which a reaction between a starting material aqueous solution and an oxidant liquid is continuously performed, the reaction is performed at a temperature of 30° C. to 100° C., and ferrite particles having a size of 3 to 20 nm are obtained (Patent Literature 4).

The hydrothermal method is a method in which a mixture of an aqueous solution including $Co^{2+}$ ions and an aqueous solution including $Fe^{2+}$ ions is used for hydrothermal synthesis in an autoclave, and ferrite particles having relatively large particle diameters of 0.3 to 8 μm are produced by a reaction performed at a high temperature of 160° C. to 300° C. (Patent Literature 5).

In the case of producing ferrite particles by the conventional technique, ferrite particles can be produced at relatively low temperatures by the co-precipitation method or the wet oxidation method, but only nanometer-order fine particles are obtained. By the hydrothermal method, relatively large micrometer-order particles can be obtained, but there is a need to perform a hydrothermal reaction (Schikorr reaction) at a high temperature and a high pressure, which has a problem with facilities or costs.

RELATED ART

Patent Literature

Patent Literature 1: Japanese Patent No. 4138344
Patent Literature 2: Japanese Patent Publication No. H3-24412
Patent Literature 3: Japanese Patent Publication No. S60-47722
Patent Literature 4: Japanese Patent No. 5504399
Patent Literature 5: Japanese Patent Laid-Open No. H5-275224

SUMMARY OF INVENTION

Problem to be Solved by the Invention

The present invention overcomes the above-described problems of the related art and provides a producing method capable of synthesizing, with a lower energy, cobalt ferrite particles having a larger average particle diameter than conventional cobalt ferrite particles and having similar particle diameters. The present invention also provides cobalt ferrite particles having rounded shapes and similar particle diameters produced by the above-described method.

Solution to Problem

As means for solving the above-described problems, means having the following configurations is employed in the present invention.

(1) A method for producing cobalt ferrite particles, including performing a thermal treatment on an aqueous solution containing a ferrous salt and a cobalt salt stabilized by a complexing agent (ferrite precursor).

(2) The method for producing cobalt ferrite particles according to (1), wherein a ferric salt is further added to the aqueous solution (ferrite precursor).

(3) The method for producing cobalt ferrite particles according to (1), wherein a pH buffer is further added to the aqueous solution (ferrite precursor).

(4) The method for producing cobalt ferrite particles according to any one of (1) to (3), wherein the thermal treatment is a hydrothermal treatment performed in a pressure vessel within a temperature range of 130° C. to 190° C.

(5) The method for producing cobalt ferrite particles according to any one of (1) to (4), wherein the ferrous salt and the cobalt salt are iron(II) chloride and cobalt(II) chloride, respectively.

(6) The method for producing cobalt ferrite particles according to any one of (1) to (5), wherein, as the complexing agent, one selected from citrate, nitrilotriacetate or malate is used.

(7) The method for producing cobalt ferrite particles according to any one of (1) to (6), wherein the thermal treatment is performed in the presence of an oxidant in addition to the complexing agent.

(8) The method for producing cobalt ferrite particles according to (7), wherein the oxidant is nitrate.

(9) The method for producing cobalt ferrite particles according to any one of (1) to (8), wherein an alkaline aqueous solution or the ferrite precursor is press-injected into a pressure vessel in the middle of the thermal treatment or after an end of the thermal treatment, and a thermal treatment is further performed.

(10) Cobalt ferrite particles having a coefficient of variation of particle diameters, a CV value, of 0.1 to 0.3, a rounded shape and an average particle diameter of 5 to 50 μm.

(11) A copier toner containing the cobalt ferrite particles according to (10).

(12) A magnetic ink containing the cobalt ferrite particles according to (10).

(13) An MR fluid containing the cobalt ferrite particles according to (10).

(14) A white powder having the cobalt ferrite particles according to (10), wherein a titanium oxide film and a metallic silver film are provided in this order on surfaces of the cobalt ferrite particles.

(15) The white powder according to (14), having a brightness L* of 75 or higher.

Advantageous Effects of Invention

When the producing method of the present invention is employed, it is possible to produce magnetic particles of cobalt ferrite having similar particle diameters with a low energy compared with magnetic particles produced by conventional methods.

Cobalt ferrite particles obtained by the producing method of the present invention have round shapes and similar particle diameters and are thus expected to be used in applications of copier toners, magnetic inks, and MR fluids. In addition, the cobalt ferrite particles of the present invention can be turned into a white powder having a high brightness by whitening the cobalt ferrite particles by a known method or a powder colored with a bright color by further providing a colored layer.

DESCRIPTION OF EMBODIMENTS

Figure 1:
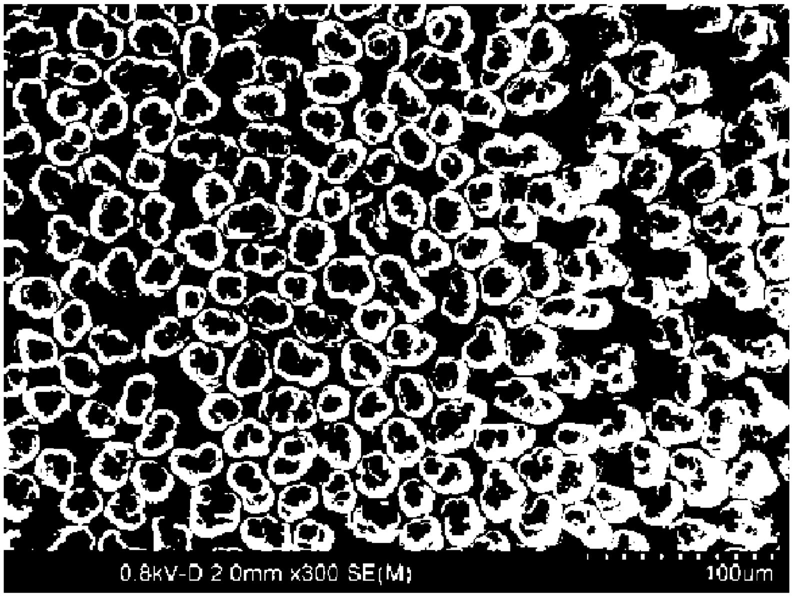
FIG. 1 is a SEM photograph of a powder sample of Example 1.

The present invention is characterized in that a ferrite precursor is formed of a ferrous salt and a cobalt salt, and the ferrite precursor is thermally treated under a high-temperature and high-pressure condition in the presence of a complexing agent.

Hereinafter, a method for producing cobalt ferrite particles of the present invention will be described in a sequence of the steps.

(Production of Ferrite Precursor)

First, a ferrous salt and a cobalt salt are dissolved in deionized and deaerated water to prepare a starting material aqueous solution.

The ferrous salt that is used in the method of the present invention is not particularly limited, and examples thereof include ferrous chloride, ferrous sulfate and ferrous nitrate. Iron wash waste liquid or the like from shaft furnaces or electric furnaces is also preferable as an inexpensive starting material. The cobalt salt is also not particularly limited, and examples thereof include cobalt chloride and cobalt nitrate. Due to, for example, availability, iron(II) chloride is preferable as the ferrous salt, and cobalt(II) chloride is preferable as the cobalt salt.

Here, the reason for the use of the deionized and deaerated water is that the charge state of the metallic ions including iron dissolved in the solution is prevented from being affected by a dissolved salt or oxygen. For example, it is known that, when free oxygen is present in the reaction system, divalent iron, which is a ferrous salt, is oxidized to trivalent iron, and that fine particles having unintended particle diameters are generated.

Next, an alkali and a complexing agent are dissolved in deionized and deaerated water to prepare an alkaline aqueous solution. After that, the starting material aqueous solution and the alkaline aqueous solution are mixed together. As the alkali, an arbitrary alkali such as sodium hydroxide, potassium hydroxide, calcium hydroxide or ammonia is selected.

When the starting material aqueous solution and the alkaline aqueous solution are mixed together, a metal complex of a starting material that is to serve as the ferrite precursor is formed.

In order to stably form the complex, the starting material aqueous solution and the alkaline aqueous solution are preferably mixed in the order as described above. In order to synthesize ferrite particles having favorable characteristics after decomposition of the complex, the pH of the liquid mixture is preferably adjusted to approximately 7 to 13.

(Complexing Agent)

The present invention is, as described above, characterized in that the ferrite precursor is made into a complex with the complexing agent before a thermal treatment to protect the ferrite precursor from being oxidized by an oxidant.

As the complexing agent in the present invention, citrate, nitrilotriacetate, or malate are used, for example.

In the case of using citrate, cobalt ferrite particles having large particle diameters with an average particle diameter of approximately 50 μm are obtained. In the case of using nitrilotriacetate or malate, fine particles having an average particle diameter of 1 μm or less are obtained.

A ferrite generation reaction in the present invention is considered to progress as described below.

In a stage before the beginning of a hydrothermal treatment, an oxidation reaction by an oxidant is not performed, and the ferrite precursor is stably present in the solution due to the complexation action of a ligand of the complexing agent. This prevents the generation of an unstable hydroxide that is likely to be oxidized and stably protects the precursor.

Next, once heating is initiated, the complex that protects the ferrite precursor gradually decomposes, and the ferrite precursor is likely to receive an oxidation action. At this time, an oxidant such as sodium nitrate may be added thereto in order to uniformly accelerate an oxidation reaction for forming a ferrite. The ferrite precursor is oxidized by the oxidation action of the oxidant in a case where the ferrite precursor is under the environment involving the oxidant, or even in a case where there is no oxidant, the ferrite precursor is oxidized by an action of a hydrothermal environment. Thus, a ferrite is formed.

In the present invention, the progress of the oxidation reaction of the ferrite precursor in a thermal treatment under hydrothermal conditions can be delayed by the complexation action of the complexing agent. This makes it possible to increase the particle diameters of ferrite particles to be synthesized and, furthermore, makes it possible to produce particles having similar particle diameters.

(Thermal Treatment)

In the present invention, a thermal treatment by a hydrothermal method is performed using a pressure vessel.

The pressure vessel used in the present invention may be an ordinary high-pressure reaction container, and examples thereof include an autoclave, a pressure cooker and a boiler. An autoclave is preferable due to versatility, for example.

In the ordinary high-temperature Schikorr method, it is common to allow the reaction to progress at a high temperature of 200° C. or higher; however, in the present invention, magnetic particles of cobalt ferrite can be synthesized within a temperature range of approximately 130° C. to 190° C. by selecting the complexing agent.

(Adjustment of Particle Diameters 1: Addition of Ferric Salt)

In the method for producing cobalt ferrite particles according to the present invention, it is possible to employ means for adjusting the particle diameters of cobalt ferrite particles to be produced in each step of the production method. Hereinafter, several means for adjusting the particle diameters will be listed. These means can be singly employed or a plurality of means can be employed in combination.

A ferric salt can be added to the starting material aqueous solution (the aqueous solution of the ferrous salt and the cobalt salt) to add the ferric salt to the aqueous solution containing the ferrous salt and the cobalt salt stabilized by the complexing agent, whereby the particle diameters of cobalt ferrite particles can be adjusted. In this way, since the trivalent iron ions of the ferric salt act as nuclei for the formation of ferrite particles, a ferrite formation reaction is accelerated, regardless of the presence or absence of the oxidant, and the particle diameters of ferrite particles to be produced can be adjusted.

The ferric salt used herein is not particularly limited, and examples thereof include ferric chloride, ferric sulfate and ferric nitrate. Iron wash waste liquid or the like from shaft furnaces or electric furnaces is also preferable as an inexpensive starting material.

(Adjustment of Particle Diameters 2: Addition of pH Buffer)

A pH buffer can be added to the alkaline aqueous solution (the aqueous solution of the alkali and the complexing agent) to add the pH buffer to the aqueous solution containing the ferrous salt and the cobalt salt stabilized by the complexing agent, whereby the particle diameters of cobalt ferrite particles can be adjusted. The ferrite generation reaction is a reaction accompanying a decrease in the pH, and the decrease in the pH suppresses the decomposition of the ferrite precursor to thereby suppresses the ferrite generation reaction. Therefore, the pH buffer can be added thereto in order to suppress a decrease in the pH, whereby the growth of ferrite particles can be accelerated.

The pH buffer used herein is selected from boric acid and sodium carbonate/sodium hydrogen carbonate.

(Adjustment of Particle Diameters 3: Press-Injecting of Alkaline Aqueous Solution and Ferrite Precursor During Thermal Treatment)

The alkaline aqueous solution or the ferrite precursor (complex) can be press-injected into the pressure vessel in the middle of the thermal treatment step or after the end of the thermal treatment step, followed by further continuing the thermal treatment, whereby the particle diameters of cobalt ferrite particles can be adjusted.

When the alkaline aqueous solution is press-injected, the pH in the reaction container increases, which allows the progress of decomposition of the unreacted ferrite precursor and thus accelerates the ferrite generation reaction. Therefore, particle growth (grain coarsening) can be achieved. The alkaline aqueous solution is not particularly limited and can be appropriately selected from sodium hydroxide, potassium hydroxide, calcium hydroxide, and ammonia.

Press-injecting of the ferrite precursor (complex) is equivalent to addition of a starting material for forming ferrites, which makes it possible to accelerate the particle growth of ferrite particles. The method for producing the ferrite precursor is as described above.

(Cobalt Ferrite Particles)

Cobalt ferrite particles produced in the present invention are magnetic particles having relatively large particle diameters with an average particle diameter of 5 to 50 μm. The cobalt ferrite particles are particles having rounded shapes and similar particle diameters.

The cobalt ferrite particles of the present invention have relatively large particle diameters, are rounded and also have a narrow width of the particle size distribution. Therefore, the cohesive property between the particles is weak, and the cobalt ferrite particles can be closely packed when molded, which makes it possible to improve the magnetic characteristics of a molded article or makes it possible to increase the bulk density.

Therefore, when used in applications of copier toners, magnetic inks, and MR fluids, the cobalt ferrite particles are capable of sufficiently exhibiting the characteristics.

(White Powder)

The cobalt ferrite particles of the present invention can be made into a white powder by whitening or can be made into a colored powder by being whitened and then further provided with a colored layer.

The cobalt ferrite particles can be whitened by a known method, but are desirably whitened by, for example, a whitening method (Japanese Patent No. 4113045), which is patented by the present applicants.

This whitening method is a method for whitening powder by providing a titanium oxide film between a base particle and a metallic silver film. Specifically, the cobalt ferrite particles can be whitened by forming a titanium oxide film on the surface of the cobalt ferrite particle by the hydrolysis of a titanium alkoxide (for example, International Publication No. WO 96/28269), a reaction from a titanium salt aqueous solution (for example, Japanese Patent Laid-Open No. 11-131102), or the like and then forming a metallic silver film by a known method such as an electroless plating method.

This method makes it possible to produce a white powder having a titanium oxide film and a metallic silver film in this order on the surface of the cobalt ferrite particle of the present invention and consequently makes it possible to improve the brightness L* of the cobalt ferrite particle to 75 or higher.

EXAMPLES

Hereinafter, the present invention will be described in more detail by way of examples, but the present invention is not limited to these examples. In addition, the average particle diameter and particle size distribution of synthesized ferrite particles were measured by the following methods.

(Measurement of Average Particle Diameter)

An image in which a grid composed of 16 vertical lines and 16 horizontal lines evenly disposed was drawn on a SEM image of a powder sample was printed, the diameters of a total of 256 particles that were on intersections of the vertical lines and the horizontal lines or closest to the intersections were measured with a caliper, and the average value was obtained. In addition, the length of a scale bar on the SEM image was measured, and the particle diameters obtained in the unit of millimeters were converted to the particle diameters in the unit of micrometers using the value of the length of the scale bar. The result was used as the average particle diameter.

(Measurement of Particle Size Distribution)

Whether the cobalt ferrite particles of the present invention have similar particle diameters was determined with a CV value, which is a coefficient of variation of the particle diameters.

Specifically, statistically, the standard deviation is used as one of measure for variations in data distribution; however, currently, the standard deviation is standardized by dividing it by the arithmetic average value of the data to evaluate a variation in data. This is the CV value, which is a coefficient of variation, and, in the present invention as well, the CV value is used to evaluate the fact that the particle diameters of the formed cobalt ferrite particles vary to a small extent. A small CV value indicates that the variation in the particle size distribution is small. Particularly, particles having a CV value of 0.1 or less are considered as monodisperse particles, and the characteristics thereof are attracting attention.

Example 1 (Production of Cobalt Ferrite Particles)

(1) Preparation of Deionized and Deaerated Water 480 g of deionized water was deaerated with 2.5 L/min of $N_2$ for 30 minutes to prepare deionized and deaerated water.

(2) Preparation of Starting Material Aqueous Solution 32 g of iron(II) chloride tetrahydrate ($FeCl_2 \cdot 4H_2O$) and 8 g of cobalt(II) chloride hexahydrate ($CoCl_2 \cdot 6H_2O$) were dissolved in 172 g of the deionized and deaerated water to prepare a starting material aqueous solution.

(3) Preparation of Complexing Agent Aqueous Solution 86 g of trisodium citrate dihydrate ($C_6H_5Na_2O_7 \cdot 2H_2O$) and 5 g of sodium nitrate ($NaNO_3$) were dissolved in 168 g of the deionized and deaerated water to prepare a complexing agent aqueous solution.

(4) Preparation of Alkaline Aqueous Solution 10 g of sodium hydroxide (NaOH) was dissolved in 25 g of the deionized and deaerated water to prepare an alkaline aqueous solution.

(5) Preparation of Precursor

The starting material aqueous solution and the complexing agent aqueous solution were mixed in a $N_2$-purged container, and then the alkaline aqueous solution was added thereto to adjust the pH to 10, thereby preparing a precursor.

(6) Preparation of Magnetic Particles by Hydrothermal Treatment of Precursor

The precursor was put into a $N_2$-purged autoclave and hydrothermally treated under stirring at 190° C. for 20 hours, thereby obtaining magnetic particles.

(7) Washing of Magnetic Particles

The magnetic particles were filtered and washed with passing deionized water.

(8) Drying of Magnetic Particles

The washed magnetic particles were dried at 110° C. in the atmosphere for two hours.

Example 2

Magnetic particles were produced under the same conditions as in Example 1 except that sodium nitrate added as an oxidant in Example 1 was not used.

Example 3

Magnetic particles were produced under the same conditions as in Example 1, except that the pH that was adjusted to 10 by the addition of the alkaline aqueous solution in Example 1 was adjusted to 8, and that the hydrothermal treatment time was changed to 40 hours.

Example 4

Magnetic particles were produced under the same conditions as in Example 1 except that the amounts of iron(II) chloride tetrahydrate ($FeCl_2 \cdot 4H_2O$), cobalt(II) chloride hexahydrate ($CoCl_2 \cdot 6H_2O$), trisodium citrate dihydrate ($C_6H_5Na_2O_7 \cdot 2H_2O$) and sodium nitrate ($NaNO_3$) in Example 1 were changed to 25.7 g, 15.4 g, 59.9 g and 1.7 g, respectively.

Comparative Example 1

Magnetic particles were produced under the same conditions as in Example 1 except that the complexing agent and the oxidant used in Example 1 were not used.

A variety of characteristics of the magnetic particles are summarized and shown below.

TABLE 1

| | Example 1 | Example 2 | Example 3 | Example 4 | Comparative Example 1 |
|---|---|---|---|---|---|
| Complexing agent | Citrate | Citrate | Citrate | Citrate | Not used |
| Oxidant | Nitrate | Not used | Nitrate | Nitrate | Not used |
| Reaction temperature (° C.) | 190 | 190 | 190 | 190 | 190 |
| Average particle diameter (μm) | 25.90 | 16.49 | 47.38 | 6.84 | 0.47 |
| Standard deviation (μm) | 3.97 | 2.82 | 7.74 | 1.43 | 0.15 |
| CV value | 0.15 | 0.17 | 0.16 | 0.21 | 0.32 |

In all of Examples 1 to 4, the ferrite particles were formed by performing the thermal treatment on the ferrite precursor stabilized by the complexing agent, and the obtained particles were ferrite particles having a large average particle diameter with a small variation in the particle diameters. Since the CV values were 0.15, 0.17, 0.16 and 0.21, the particles were nearly monodispersed particles.

On the other hand, in the case of the production under the conditions of the comparative examples, all of the obtained particles had a small average particle diameter with a large variation.

Figure 2:
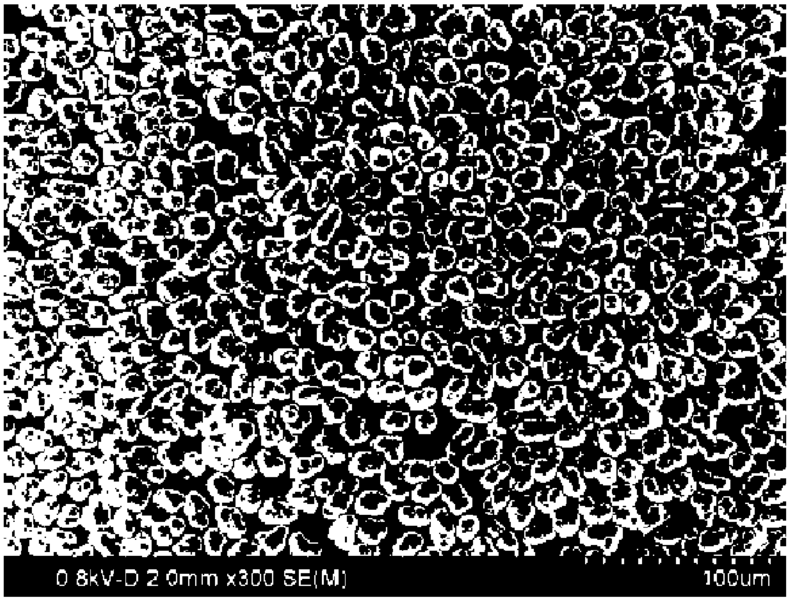
FIG. 2 is a SEM photograph of a powder sample of Example 2.
Figure 3:
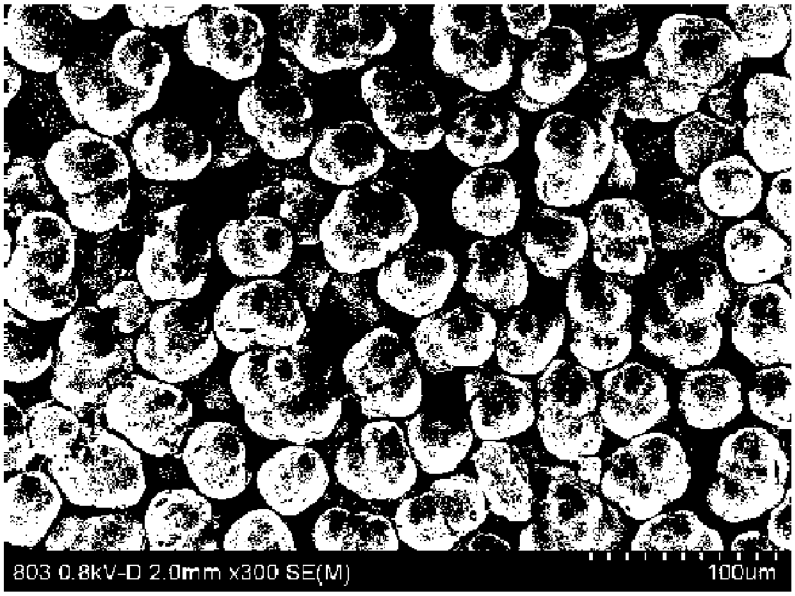
FIG. 3 is a SEM photograph of a powder sample of Example 3.
Figure 4:
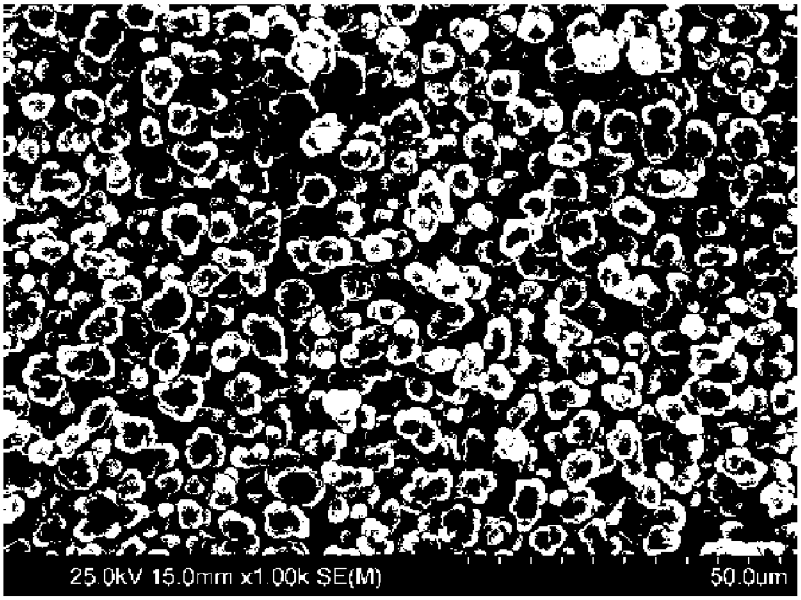
FIG. 4 is a SEM photograph of a powder sample of Example 4.
Figure 5:
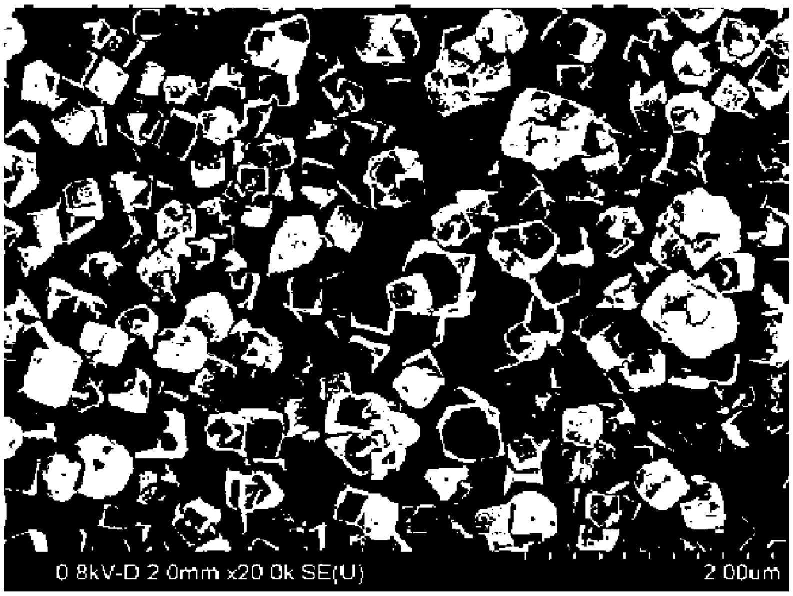
FIG. 5 is a SEM photograph of a powder sample of Comparative Example 1.

The shapes of the produced ferrite particles when observed with a SEM are as shown in FIG. 1 to FIG. 5. FIG. 1 to FIG. 4 are SEM images of the ferrite particles of Examples 1 to 4. It is found from these that the ferrite particles of Examples 1 to 4 are different from the ferrite particles of Comparative Example 1 of FIG. 5 in that the ferrite particles were rounded.

Example 5 (Whitening of Cobalt Ferrite Particles)

2.2 mL of a titanium tetrachloride solution (16.0 to 17.0% in terms of Ti), 5.84 g of aqueous ammonia, and 10.0 g of hydrogen peroxide water were mixed with 19.8 g of deionized water to prepare a yellow transparent peroxotitanic acid solution. 9.92 g of boric anhydride, 11.72 g of potassium chloride, and 2.55 g of sodium hydroxide were dissolved in 535.81 g of deionized water, and 16.75 g of the ferrite particles obtained in Example 4 were suspended therein. The peroxotitanic acid solution was dropped into and mixed with the suspension while the suspension is stirred, and then suspended solids were dried, thereby obtaining a titanium oxide film-coated powder.

1.2 g of glucose, 0.12 g of tartaric acid, and 2.12 g of ethanol were dissolved in 26.56 g of deionized water to prepare a reduction liquid. 1.25 g of sodium hydroxide, 1.75 g of silver nitrate, and 3 g of aqueous ammonia were mixed with 90 g of deionized water to prepare a silver ammine complex solution, and 6.3 g of the titanium oxide-coated powder was suspended in the silver ammine complex solution. The reduction liquid was mixed with the suspension while the suspension is irradiated with ultrasonic waves, and the suspended solids were dried, thereby obtaining a silver film-coated powder. The obtained white powder had a brightness L* of 79.98.

INDUSTRIAL APPLICABILITY

Cobalt ferrite particles obtained by the producing method of the present invention have round shapes and similar particle diameters and are thus expected to be used in applications of copier toners, magnetic inks, and MR fluids.

The invention claimed is:

1. A method for producing cobalt ferrite particles, comprising forming a ferrite precursor aqueous solution containing a ferrous salt, an oxidant, and a cobalt salt stabilized by a complexing agent in a pressure vessel, and then performing a first thermal treatment on the ferrite precursor aqueous solution, wherein the entirety of the first thermal treatment is conducted on the ferrite precursor aqueous solution in the presence of the oxidant, and wherein the first thermal treatment is performed within a temperature range of 130° C. to 190° C. under a hydrothermal condition.

2. The method for producing cobalt ferrite particles according to claim 1, wherein a ferric salt is further added to the ferrite precursor aqueous solution.

3. The method for producing cobalt ferrite particles according to claim 1, wherein the ferrite precursor aqueous solution further contains a pH buffer.

4. The method for producing cobalt ferrite particles according to claim 1, wherein the ferrous salt and the cobalt salt are iron(II) chloride and cobalt(II) chloride, respectively.

5. The method for producing cobalt ferrite particles according to claim 1, wherein the complexing agent is selected from citrate, nitrilotriacetate or malate.

6. The method for producing cobalt ferrite particles according to claim 1, wherein the oxidant is a nitrate.

7. The method for producing cobalt ferrite particles according to claim 1, wherein an alkaline aqueous solution is press-injected into the pressure vessel in the middle of the first thermal treatment or after an end of the first thermal treatment, and then a second thermal treatment is performed on the ferrite precursor aqueous solution and the alkaline aqueous solution.

8. A method, comprising:

forming a ferrite precursor aqueous solution containing a ferrous salt, an oxidant, and a cobalt salt stabilized by a complexing agent, and then performing a thermal treatment on the ferrite precursor aqueous solution, wherein the entirety of the thermal treatment is conducted on the ferrite precursor aqueous solution in the presence of the oxidant, and wherein the thermal treatment is performed within a temperature range of 130° C. to 190° C. under a hydrothermal condition;

thereby forming cobalt ferrite particles having a coefficient of variation of particle diameters, a CV value, of 0.1 to 0.3, a rounded shape and an average particle diameter of 5 to 50 μm.

9. A copier toner comprising cobalt ferrite particles formed according to the method of claim 8.

10. A magnetic ink comprising cobalt ferrite particles formed according to the method of claim 8.

11. An MR fluid comprising cobalt ferrite particles formed according to the method of claim 8.

12. The method according to claim 8, further comprising forming a titanium oxide film and a metallic silver film in this order on surfaces of the cobalt ferrite particles to form a white powder.

13. The method according to claim 12, wherein the white powder has a brightness L* of 75 or higher.

* * * * *